United States Patent
Boucard et al.

(10) Patent No.: US 7,008,522 B2
(45) Date of Patent: Mar. 7, 2006

(54) METHOD OF LOCALLY REPAIRING PARTS COVERED WITH A THERMAL BARRIER

(75) Inventors: Bruno Gilles François Boucard, Les Retinieres (FR); Jean-Paul Fournes, Dannemois (FR); Frédéric Yves Pierre Jacquot, Chatellerault (FR); Yann Philippe Jaslier, Melun (FR); Jacques Louis Leger, Combs la Ville (FR); André Hubert Louis Malie, Chatellerault (FR); Guillaume Roger Pierre Oberlaender, Paris (FR); Catherine Marie-Hélène Richin, Roinville sous Dourdan (FR)

(73) Assignee: Snecma Moteurs-Snecma Services, Paris (FR)

( * ) Notice: Subject to any disclaimer, the term of this patent is extended or adjusted under 35 U.S.C. 154(b) by 0 days.

(21) Appl. No.: 10/488,294

(22) PCT Filed: Jul. 11, 2002

(86) PCT No.: PCT/FR02/02437

§ 371 (c)(1),
(2), (4) Date: Mar. 2, 2004

(87) PCT Pub. No.: WO03/006710

PCT Pub. Date: Jan. 23, 2003

(65) Prior Publication Data

US 2004/0261914 A1  Dec. 30, 2004

(30) Foreign Application Priority Data

Jul. 12, 2001 (FR) .................................. 01 09259

(51) Int. Cl.
C23C 28/00 (2006.01)

(52) U.S. Cl. ...................... 205/115; 204/487; 204/509; 204/510; 205/184; 205/495; 205/206; 205/208; 205/228

(58) Field of Classification Search ................ 205/115, 205/184, 195, 206, 208, 228, 509, 510; 204/487
See application file for complete search history.

(56) References Cited

U.S. PATENT DOCUMENTS

| 5,336,382 A | 8/1994 | Bodin |
| 5,813,118 A | 9/1998 | Roedl et al. |
| 5,897,966 A | 4/1999 | Grossklaus et al. |

(Continued)

FOREIGN PATENT DOCUMENTS

EP  0808913  11/1997

(Continued)

*Primary Examiner*—Roy King
*Assistant Examiner*—William T. Leader

(57) ABSTRACT

A method of locally repairing parts coated with a thermal barrier including a ceramic outer layer and a metal underlayer of alumina-forming alloy for protecting the substrate against oxidation and for bonding with the ceramic outer layer, includes: defining the zone for repair with a mechanical mask adapted to the shape of the part and the zone for repair; scouring the zone for repair so as to remove the ceramic, the alumina layer, and the damaged portions of the underlayer; supplying materials for repairing the underlayer to the repair zone by subjecting the partially-scoured part to metal deposition by use of an electrical current; and subjecting the part to a heat treatment in order to enable the added metals to diffuse into the remaining underlayer in the repair zone for repair and to enable a surface film of alumina to form. After the underlayer has been reconstituted, the zone for repair is again defined by a mechanical mask and a new ceramic layer is deposited thereon.

14 Claims, 10 Drawing Sheets

U.S. PATENT DOCUMENTS 5,972,424 A    10/1999   Draghi et al.
6,183,888 B1 *  2/2001   Alperine et al. ............ 428/670

FOREIGN PATENT DOCUMENTS

| EP | 1013786 | 6/2000 |
| EP | 1013787 | 6/2000 |
| EP | 1013796 | 6/2000 |
| EP | 1101833 | 5/2001 |
| JP | 05042425 | 2/1993 |

* cited by examiner

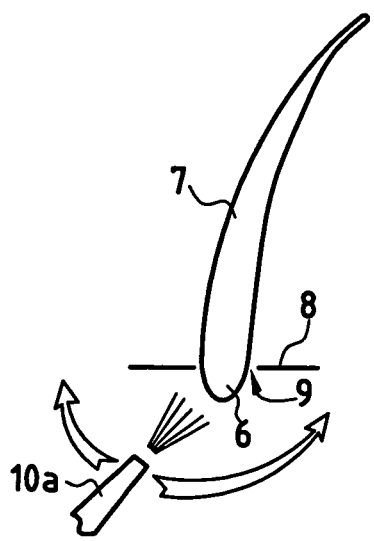
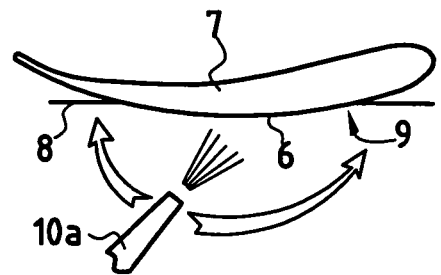
FIG.3A  FIG.3B
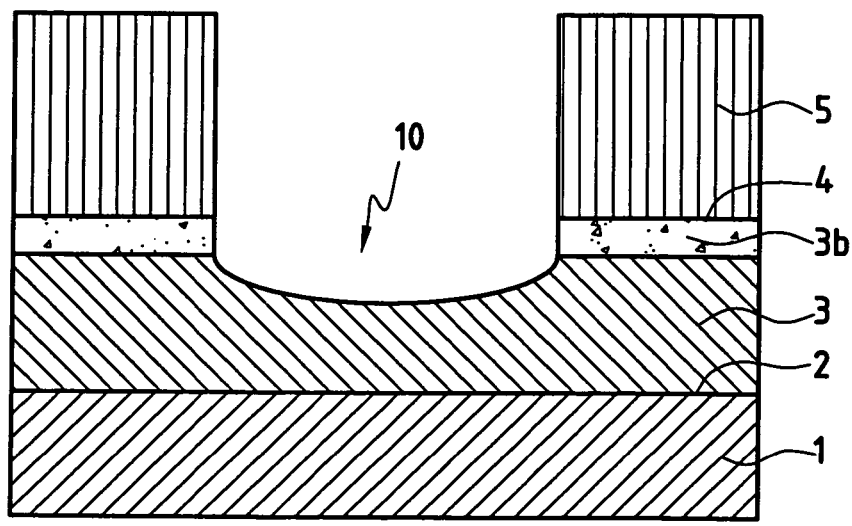
FIG.4

METHOD OF LOCALLY REPAIRING PARTS COVERED WITH A THERMAL BARRIER

BACKGROUND OF THE INVENTION

The invention relates to locally repairing parts coated in a thermal barrier and subjected in operation to a hostile environment, such as the nozzles and moving blades of high pressure (HP) turbines in turbomachines, in particular for aviation.

DESCRIPTION OF RELATED ART

The continuing improvement in the efficiency of modem gas turbines requires ever higher temperatures to be used at the turbine inlet. This trend has encouraged constituting the parts of the HP turbine such as the moving blades and the nozzles. For this purpose, single-crystal superalloys with very high volume fractions of hardening gamma prime phase have been developed. The development of superalloys does not suffice to keep up with the increasing requirements for the lifetime of parts at high temperatures. Thus, more recently, thermally insulating coatings have been introduced to lower the temperature of metal parts that are cooled by internal convection.

Such thermally insulating coatings are constituted by an outer layer of zirconia-based ceramic stabilized by yttrium oxide deposited on an underlay of an alumina-forming alloy serving to bond with the ceramic coating while also protecting the metal from oxidation. Thermal barrier underlayers are typically of the MCrAlY class (where M designates nickel or cobalt) or of the aluminide (NiAl) class. Amongst aluminides, coatings of aluminides modified by a precious metal such as platinum ($Ni_{(1-x)}Pt_xAl$) constitute the underlayer systems of choice.

To be able to withstand the thermal stresses of differential expansion relative to the base metal, the ceramic outer layer must possess an appropriate microstructure enabling it to accompany the deformations of the part without flaking off (known as "spalling"). That requires in particular the development of sophisticated deposition techniques that confer segmented microstructures to such coatings. Microsegmentation gives coatings of ceramic type the ability to be subjected to microdeformations, even though ceramics are known for their poor ductility. That achievement has been obtained in particular by the development of plasma spraying. That technique consists in melting the ceramic material in powder form in a high density plasma and in spraying semi-molten droplets onto the surface of the part to be coated. That method deposits a coating that is lamellar with an array of microcracks that are more or less parallel to the plane of the coating. Plasma thermal barriers are now in widespread use for protecting combustion chambers.

For high pressure turbine parts, the physical vapor deposition technique is preferred over the thermal spraying technique. This technique causes the ceramic deposit to have a microstructure that is constituted by columns extending perpendicularly to the surface of the part. Such a microstructure presents the advantage of being even more capable of accommodating differential expansion. As a result, coatings deposited by an electron beam physical vapor deposition (EB-PVD) technique possess an ability to withstand thermal shock greater than that of plasma deposits. In contrast, ceramic coatings made by plasma spraying have a lamellar microstructure which does not have the same ability to deform and withstand thermal shock. It should be observed that the ability of plasma coatings to withstand flaking when deposited on small radii of curvature is much poorer. In addition, thermal spraying poses a serious problem, making it naturally difficult to control in the blade the obstruction of cooling holes. Finally, sprayed deposits suffer from a surface state that is unsatisfactory for aviation applications.

In the EB-PVD technique, parts are coated by ceramic vapor condensing in an evacuated enclosure with partial pressure of gas that is inert or reactive. The ceramic vapor is generated by evaporating sintered ceramic bars under an electron beam. The electron beam heats the surface of the ceramic bars, and only the surface of a part facing the surface of the bars becomes covered in a layer of ceramic. In order to be able to cover the profile of a new turbine blade, it is therefore necessary to rotate the part in the vapor like cooking on the spit.

Rotating the part has the effect of reducing deposition rate by a factor of 3.14 compared with a stationary surface parallel to the surface of the bars. Furthermore, setting parts into rotation during the EB-PVD operation requires the parts to be spaced apart from one another, thereby reducing the payload of a batch of parts for treatment. In the oven, only the space situated above the bars can be used for performing deposition properly, and that further reduces the number of parts that can be treated in one batch. Setting the parts into rotation thus increases the cost of depositing ceramic. The relatively slow rate of deposition, the poor deposition yield of about 5%, and the cost of acquiring such a machine make depositing ceramic by the EB-PVD method particularly expensive. The cost of a thermal barrier system can lie in the range 15% to 25% of the cost of a part.

In operation, the thermal barrier coating on a part is stressed in highly non-uniform manner. The most severe stresses are encountered in the region of the leading edge of the blade because of the high heat flux, and of impacts from particles and debris ingested in the engine or given off by upstream sections of the turbine.

In addition, the local radius of the leading edge produces peel-off stresses in the ceramic layer that encourage flaking. The potential lifetime of a turbine blade coated in a thermal barrier is thus shortest at the leading edge of the blade.

As a result of this combination of stresses, it is found that the thermal barrier becomes damaged in most cases in the region of the leading edge. This damage is typically manifested by the thermal barrier flaking off in the region of the leading edge of the blade, and by significant oxidation of the underlayer in zones where the ceramic has flaked off.

In practice, it is found that the presence of very localized damage on the part leads to the entire thermal barrier coating being reconditioned. The ceramic coating is removed in full, then the underlayer of the thermal barrier is removed. Such operations are difficult since they can lead to a reduction in the thickness of webs of the part and to an enlargement of vents therein, thus leading to a decrease in the potential lifetime of a part. The part is subsequently lengthened by building out the tip of the blade. The coating is subsequently reconditioned by depositing an underlayer and a ceramic coating, thus making it difficult to control vent obstruction.

In other words, zones of the part that are in good condition are needlessly subjected to risky operations of coating removal and reconditioning. This practice thus has the major drawback of affecting the potential of the part in zones which present small web thicknesses.

U.S. Pat. No. 5,723,078 discloses a repair technique which consists in cleaning the underlayer locally in the zone where the ceramic coating has flaked off and in depositing ceramic by a technique that is preferably other than EB- PVD. It is clear that that invention is applicable only to circumstances where the ceramic has flaked off from a zone of the part that is not critical from the point of view of the severity of the stresses to which it is subjected and where it is acceptable to make use of deposition techniques such as plasma spraying. The technique described in that patent therefore does not apply to the common case which applies to the most critical regions of blades, and in particular the leading edges of blades.

EP 0 969 116 teaches that an underlayer can be made in a controlled manner on a new blade, the underlayer subsequently being covered in an outer layer of ceramic in such a manner that the underlayer can limit oxidation in the event of the ceramic flaking off from critical zones such as the leading edge and the trailing edge. That document says nothing about repairing flaky zones and nothing about reconstituting the ceramic outer layer in such zones.

EP 1 013 787 relates to local repair of metal protective coatings on parts such as turbine blades. However those parts do not have any ceramic outer layers.

U.S. Pat. No. 5,254,413 relates to a method of making a metal protective layer in non-protected zones of a part that is already covered in a ceramic outer layer by means of a pack cementation method without the presence of halogen elements. That document does not make provision for subsequently covering said zones in a ceramic layer, and the underlayer is reduced to a simple combination of aluminum Al and alumina $Al_2O_3$ of characteristics that are very limited.

BRIEF SUMMARY OF THE INVENTION

An object of the invention is to propose a method of locally repairing parts coated in a thermal barrier, that enables the underlayer in particular to be reconditioned in the zones that are to be repaired.

Another object of the invention is to propose a method of reconstituting a columnar ceramic outer layer solely in the zones that need repair after the underlayer in said zones have been reconditioned.

The invention thus provides a method of locally repairing parts coated in a thermal barrier constituted by a ceramic outer layer and a metal underlayer of alumina-forming alloy for protecting the substrate against oxidation and for bonding to the ceramic outer layer.

The invention comprises the following steps:

a) defining the zone for repair with a mechanical mask adapted to the shape of the part and the zone for repair;

b) scouring the zone for repair so as to remove from said zone the ceramic, the alumina layer, and the damaged portions of the underlayer;

c) supplying materials for repairing the underlayer to said zone by subjecting the partially-scoured part to metal deposition by means of electrical current; and d) subjecting the part to heat treatment in order to enable the added metals to diffuse into the remaining underlayer in the zone for repair and to enable a surface film of alumina to form.

The zone for repair is preferably scoured mechanically by sandblasting, sanding, milling, or by laser beam.

The insulating properties of the ceramic layer that remains outside the scoured zone enable the metals that are applied to the deposited electrically solely in the scoured zone since it is conductive specifically because it has been scored.

The materials for repairing the underlayer in the zone for repair are preferably applied by electrophoresis. The electrophoretic deposit is consolidated by electrolytically depositing nickel, palladium, or platinum. It is also possible to use the so-called "co-deposition" method which combines electrophoretic deposition and deposition by electrolysis in a single operation.

In order to aluminize the underlayer, a layer of aluminizing paint is applied to the deposited metals. Such application of aluminizing paint on the still-porous underlayer serves both to re-aluminize the underlayer and to consolidate it temporarily prior to heat treatment.

Such aluminization is not always needed. An external supply of aluminum is necessary with NiAl underlayers since they have a large fraction of Al. However with MCrAlY underlayers which have a much smaller fraction of Al, it can happen that the aluminum which rises from the substrate by diffusion suffices.

In order to diffuse the metals that are supplied, the part is subjected to heat treatment at a temperature higher than 700° C. for at least two hours. The temperature is preferably close to 1000° C. and the duration of the heat treatment is about three hours.

After the operation of diffusing the metals by heat treatment, the part can be reused without adding ceramic to the repaired zone. However the part is also ready for a new ceramic outer layer to be deposited on its zones that has been refilled with metal.

In the invention, the zone to be reconstituted is defined by means of a mechanical mask and a new ceramic outer layer is deposited by a method of evaporating ceramic by electron bombardment so as to obtain a columnar structure.

Advantageously, only the surface of the zone that is to be reconstituted is exposed to the source of ceramic vapor.

Advantageously, the part is caused to pivot with oscillating motion of given amplitude during exposure so as to deposit a ceramic layer that is substantially uniform on the zone to be reconstituted.

BRIEF DESCRIPTION OF THE DRAWINGS

Other advantages and characteristics of the invention appear on reading the following description made by way of example and with reference to the accompanying drawings, in which:

FIGS. 3A and 3B show respective turbine blades in which the leading edge and the suction side are to be repaired;

FIG. 4 is a section view showing the appearance of the zone for repair after the scouring operation;

DETAILED DESCRIPTION OF THE INVENTION

Figure 1:
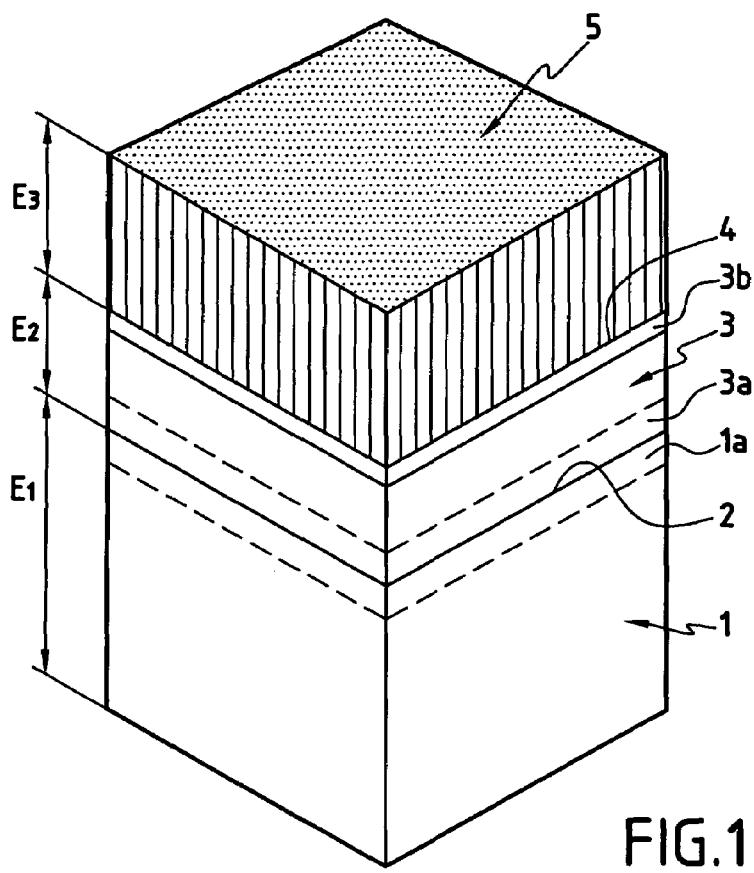
FIG. 1 shows a portion of a part in good condition coated with a thermal barrier.

FIG. 1 shows a portion of a part 1 in good condition made of a nickel-based superalloy of thickness E1, coated on its outside face 2 in a metal underlayer 3 of an alumina-forming metal alloy, with its outside face 4 itself being coated in an outer layer 5 of columnar ceramic having a thickness E3.

By way of example, the part 1 is an element of a high pressure turbine stator in a turbojet comprising a plurality of stationary vanes, or it is a moving blade for this type of turbine.

The role of the metal underlayer 3 is to protect the part 1 against oxidation and against corrosion of the kind that can be caused by the hot and aggressive gases flowing through the turbine. Its role is also to provide bonding for the ceramic outer layer 5.

The underlayer is made by depositing aluminide or an MCrAlY alloy in which M is preferably nickel or cobalt, using thermochemical methods of pack or vapor cementation. The underlayer may also include platinum. By means of heat treatment, metal, and in particular nickel, diffuses from the part 1 into the underlayer 3 and aluminum diffuses from the underlayer 3 into the part. The outside face 2 of the part 1 is at the interface between an outer layer 1a of the part 1 made of NiAl alloy rich in nickel and an inner zone 3a of the underlayer made of NiAl alloy rich in aluminum. The underlayer 3 also presents, close to the outside face 4, a film of alumina 3b which is impermeable to oxygen and which provides bonding for the ceramic outer layer 5.

The outer layer 5 is made by evaporation under electron bombardment of a zirconia-based oxide that has been stabilized partially or completely by adding yttrium oxide.

The thickness E3 of the outer layer 5 lies in the range 100 micrometers ($\mu$m) to 500 $\mu$m, and is typically 150 $\mu$m.

The thickness E2 of the underlayer 3 is typically 70 $\mu$m, and may lie in the range 40 $\mu$m to 100 $\mu$m.

The thickness E1 of the web of the part 1 may be as little as 0.5 millimeters (mm) when the part is a high pressure turbine blade cooled from the inside.

The part 1 coated in this way in the metal underlayer 3 and the ceramic outer layer 5 can suffer damage in operation due to thermal shock, to flaking of the outer layer 5, to oxidation of the underlayer 3, and to erosion by impact from particles.

Figure 2:
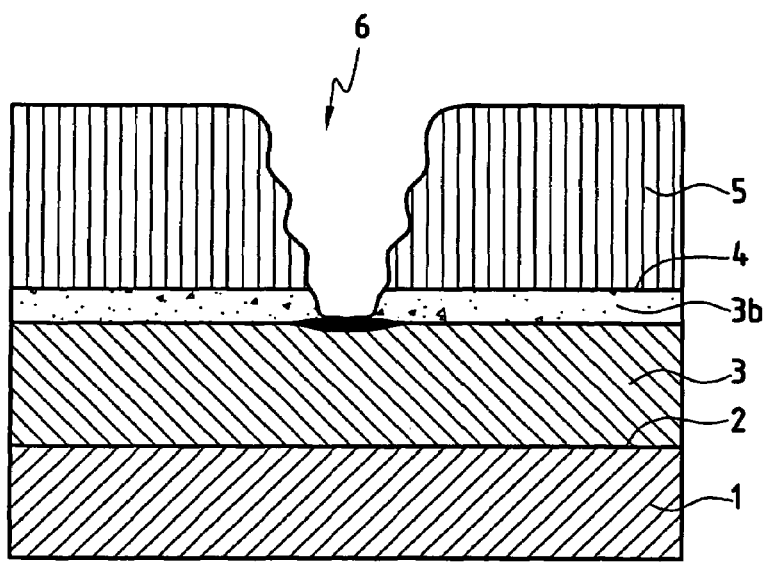
FIG. 2 is a section showing the appearance of the microstructure of a flaky zone for repair.

FIG. 2 thus show an outer zone 6 of the part 1 which has flaked and in which the underlayer 3 has been subjected to significant oxidation. This zone 6 may be situated, for example, in the leading edge of a turbine blade 7.

The object of the invention is to propose a method of repairing the flaked zone 6, and in particular a method of reconstituting the underlayer 3 with the film of alumina 3b in said zone 6.

FIG. 3A shows a blade 7 in which the zone 6 is located on the leading edge, and FIG. 3B shows a blade 7 in which the zone 6 is located in the suction face.

To repair the zone 6, it is defined by a mask 8 which includes a window 9 in which the flaked zone 6 is exposed.

The size of the window 9 is a function of the area to be treated, and the geometrical configuration of the mask 8 is adapted to the shape of the part 1 for treatment. In practice, all of the blades of a given turbine are treated using the same type of mask, since statistically the blades of a given turbine are all subjected to substantially the same damage in the same zones.

Once the blade 7 has been fitted with the mask 8, the zone 6 is scoured mechanically in register with the window 9 so as to remove the ceramic outer layer 5, the alumina film 3b, and a fraction of the thickness of the underlayer 3 so as to remove the oxides, but care is taken not to attack the substrate 1.

Scouring can be performed by sandblasting or by a high pressure water jet, with or without abrasive, using a nozzle 10a directed towards the window 9 and moved during the treatment so as to scour the portion of the blade 7 that is visible through the window 9. After the zone 6 has been scoured, the blade 7 presents in this zone 6 an indentation 10 defined by the remaining ceramic outer layer 5 which presents flat sides around the indentation, as can be seen in FIG. 4.

The underlayer 3 then needs to have its ability to provide protection against oxidation and corrosion restored in the scoured zone 6.

Since the remaining outer layer 5 does not conduct electricity and since the substrate 1 and the underlayer 3 are made of metal and do conduct electricity, the method takes advantage of the insulating properties of the ceramic to deposit the metals that are to constitute the underlayer 3 in the scoured zone 6, in particular nickel, chromium, cobalt, or MCrAlY.

Deposition is performed by electrophoresis or by electrolysis. No mask is needed for this operation since the remaining ceramic is electrically insulating. The quantity of material supplied corresponds substantially to the thickness of the underlayer 3 that has been removed by scouring.

Deposition is preferably performed by electrophoresis since this operation is rapid, lasting only a few seconds, and in addition it enables a plurality of metals to be deposited in a single operation. The resulting spongy layer is easy to infiltrate with other metals, such as platinum, palladium, or aluminum.

When the underlayer is refilled with MCrAlY, an electrophoresis bath is used comprising a mixture of 40% nitromethane and 60% isopropyly alcohol to which 5 $\mu$m to 10 $\mu$m powder grains of MCrAlY are added at a concentration of 60 grams (g) per liter (l). To make a deposit that is 20 $\mu$m thick, a voltage of 400 volts (V) is applied for five seconds with the part 1 being connected as a cathode.

Precious metals such as platinum and palladium can be deposited by electrolysis. These metals infiltrate into the spongy structure obtained by electrophoresis.

Figure 5:
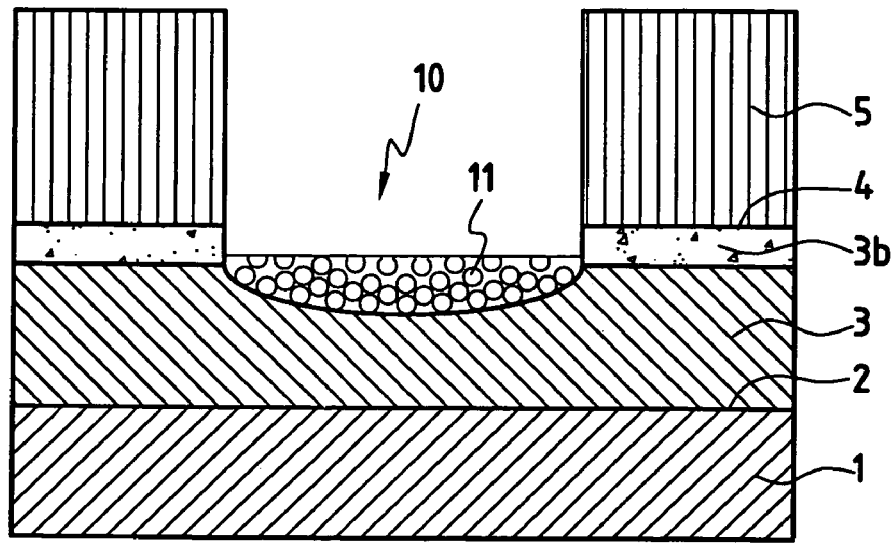
FIG. 5 shows the same zone after depositing metals by electrophoresis.

FIG. 5 shows the appearance of the indentation 10 after the electrophoresis operation. The bottom of the indentation 10 has a spongy structure 11 of the metals that have been supplied.

Figure 6:
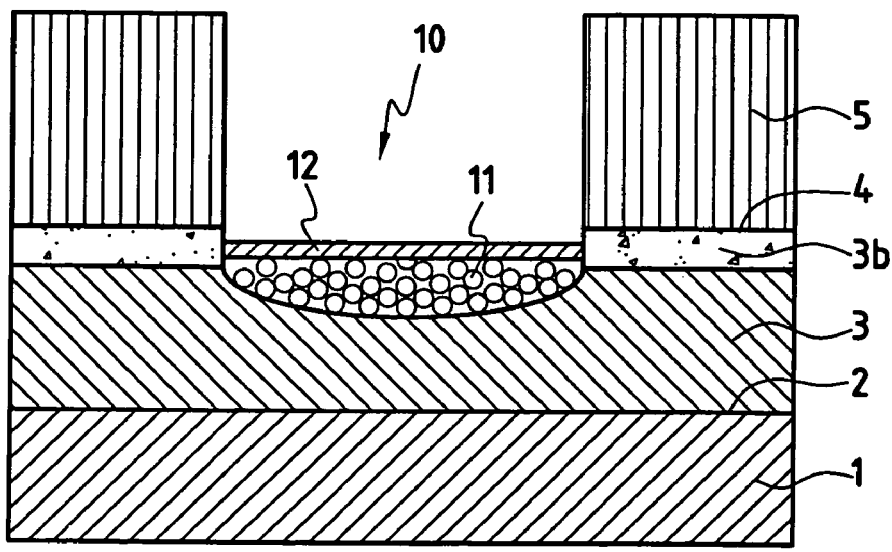
FIG. 6 shows the zone for repair after the operation of depositing precious metals by electrolysis.

FIG. 6 shows the bottom of the indentation 10 after a layer 12 of platinum has been added, e.g. by electrolysis.

The following operation of the method is optional and consists in aluminizing the bottom of the indentation 10. This aluminization cannot be performed by pack or vapor cementation methods since such methods require the presence of an activator such as ammonium fluoride $NH_4F$ or ammonium chloride $NH_4Cl$ which, on decomposing at high temperature, produce hydrochloric acid or hydrofluoric acid, which would then scour the outer layer 5 of the remaining ceramic.

Figure 7:
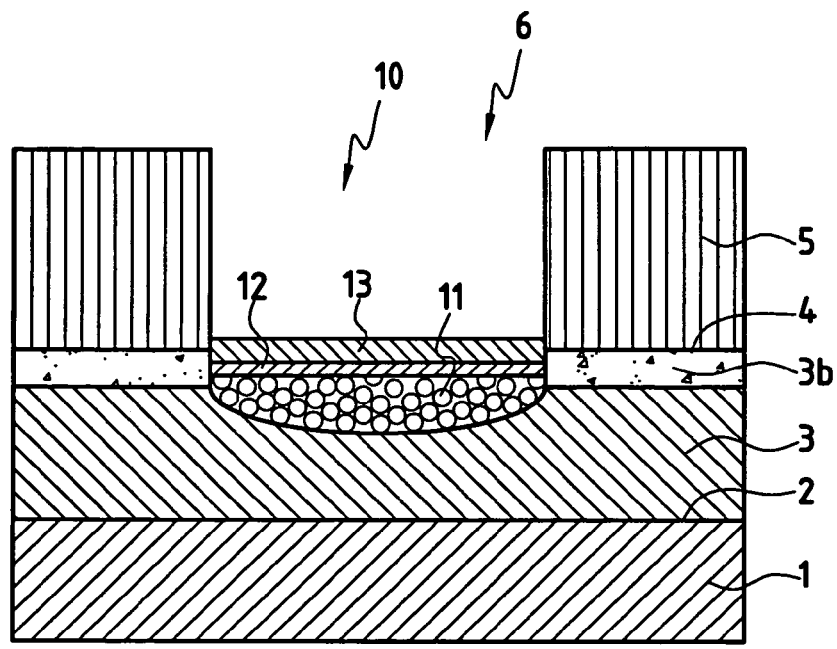
FIG. 7 shows the same metal-filled zone after an aluminizing paint has been applied.
Figure 8:
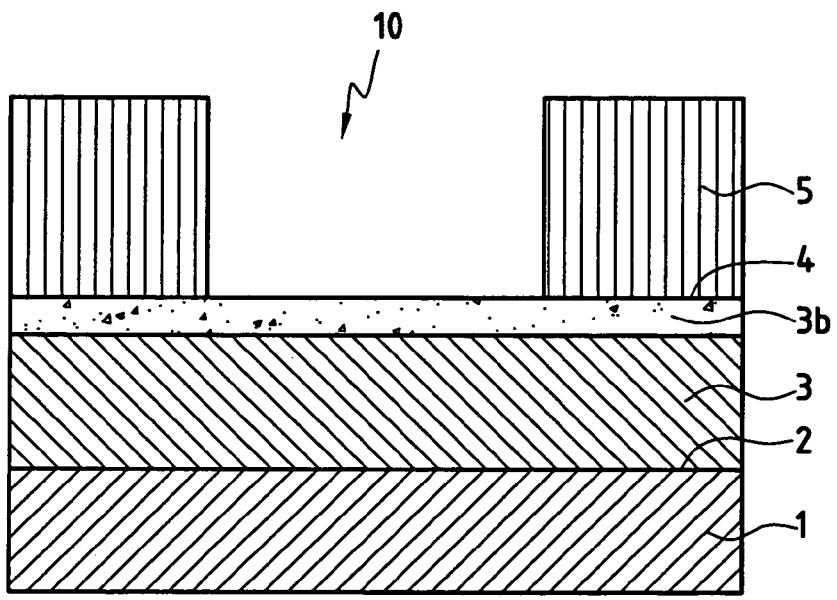
FIG. 8 shows the appearance of the underlayer after diffusion heat treatment.

In the invention, and as shown in FIG. 7, aluminization is done by applying a layer 13 of aluminizing paint onto the bottom of the indentation 10 on the layers 11 and 12 of metal that have been supplied, with the paint infiltrating into the spongy structure 11. This application is performed using a paintbrush. The paint comprises aluminum and silicon in suspension in water. The silicon powder makes the suspension colloidal. This paint is commercially available under the name Sermaloy J. Preheating needs to be performed prior to the MCrAlY operation with Sermaloy J. The diffusion which is intended to form an aluminide that withstands oxidation and corrosion is itself performed at a temperature of 1000° C. for three hours. This diffusion also leads to the alumina film 3b being reconstituted in the bottom of the indentation, as can be seen in FIG. 8.

In reality, the metals of the layer 12 supplied by electrolysis penetrate into the spongy structure 11 of the metals supplied by electrophoresis and consolidate the spongy structure by bonding the electrophoretic particles to one another. Similarly, the layer 13 of aluminizing paint penetrates between the electrophoretic particles in the same manner as a liquid is absorbed by a sponge.

The reconstituted underlayer is not necessarily identical to the initial underlayer. It is quite possible to have an initial underlayer made of NiAl and for it to be reconstituted with MCrAlY, or vice versa.

From this stage, the underlayer 3 is fully restored and the part 1 can be reused without any further treatment.

However the ceramic outer layer 5 is preferably reconstituted in the remaining portion of the indentation 10.

Figure 9:
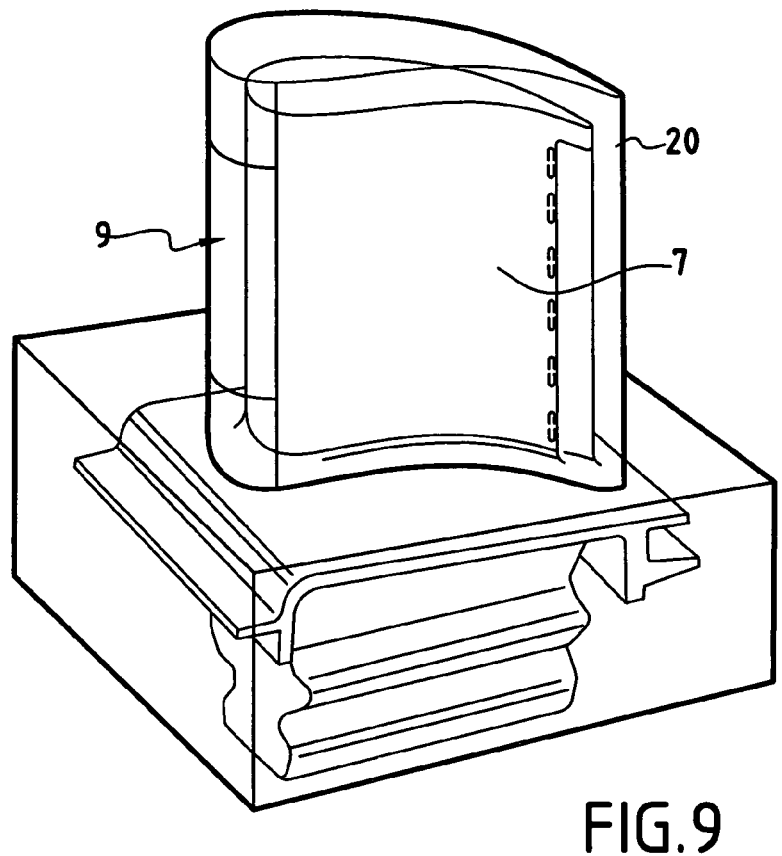
FIG. 9 shows a blade whose underlayer has been restored, the blade being fitted with a mask ready for reconstituting the ceramic outer layer in the zone that is to be repaired.
Figure 11:
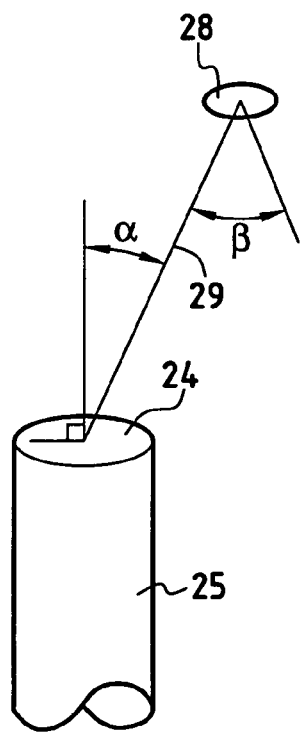
FIG. 11 shows the path followed by an emitted ceramic particle between the source and a portion of the surface to be covered.

To do this, and as shown in FIG. 9, the part 1 or the blade 7 is again fitted with a mask 20 having a window 9 surrounding the orifice of the indentation 10. The mask 20 protects all of the ceramic outer layer 5 situated outside the indentation 10. Ceramic is deposited in the indentation 10 by the electron bombardment physical vapor deposition (EB-PVD) method.

Figure 10:
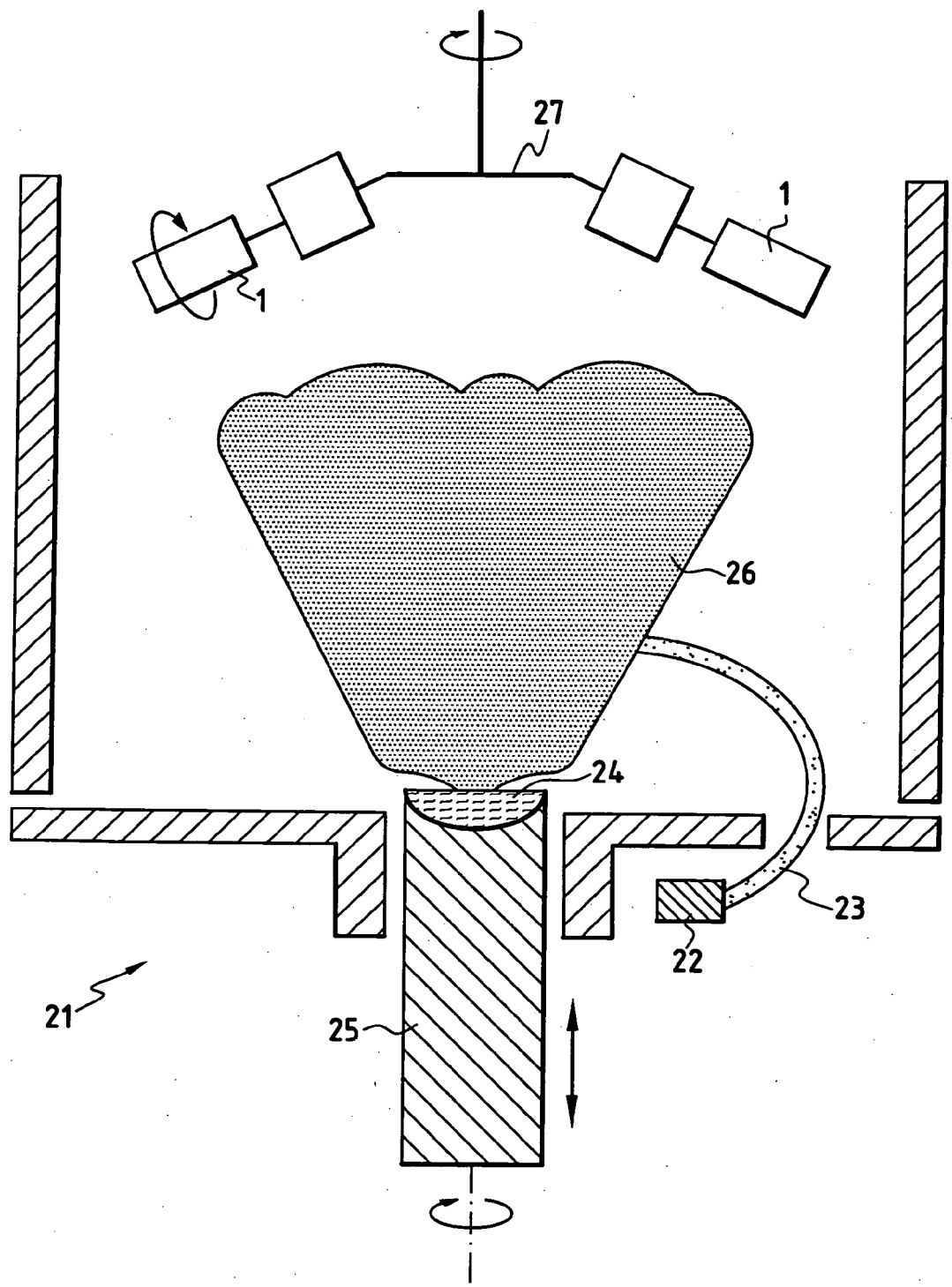
FIG. 10 shows apparatus for depositing the ceramic outer layer by electron bombardment.

FIG. 10 is a diagram of apparatus 21 for producing ceramic vapor in an evacuated chamber, the apparatus comprising at least one electron gun 22 emitting a beam 23 of electrons that is deflected by a magnetic field towards the outside face 24 of a bar 25 of zirconia and yttrium ceramic matrix. Under the effect of the bombardment, a cloud 26 of ceramic material vapor is emitted into the chamber. A device 27 supports parts 1 carrying masks 20 over the source of material vapor.

The speed V at which ceramic is deposited on a zone 28 of surface that is exposed to the ceramic material is a function of the angle $\alpha$ between the normal to the end face 24 and the part 29 of the material between the face 24 and the zone 28, and it is also a function of the angle $\beta$ between the part 29 and the normal to the surface 28, and it is inversely proportional to the square of the length d of the path 29. This speed V is thus equal to $K \cdot \cos \alpha \cdot \cos \beta / d^2$ where K is a constant that is a function of the energy of the electron bombardment and the surface area from which evaporation takes place.

Thus, only those surfaces of the parts 1 that are exposed to ceramic vapor paths are subjected to deposition of ceramic material. In reality, the vapor diffuses to some extent all around the parts, but deposition speed is much slower and difficult to control since it depends on the environment of the parts.

Because the operation of depositing ceramic is relatively lengthy, a plurality of parts 1 are introduced into the apparatus 21. To ensure that deposition takes place in substantially uniform manner in the indentations 10 in the parts, only the indentations referenced 10 in FIGS. 4 to 8 are exposed towards the end face 24 of the bar of material 25. The device 27 supporting the parts 1 includes means for causing the parts to oscillate during deposition treatment so that all portions of the surface of the indentations 10 in all of the parts 1 contained in the apparatus 21 receive a ceramic outer layer 5 that is substantially uniform. A "useful" volume is defined in the oven in which it is possible to place the parts and govern the thickness of the coating to within ±15%. The device 27 enables the treated parts to be kept in the useful volume.

Figure 12:
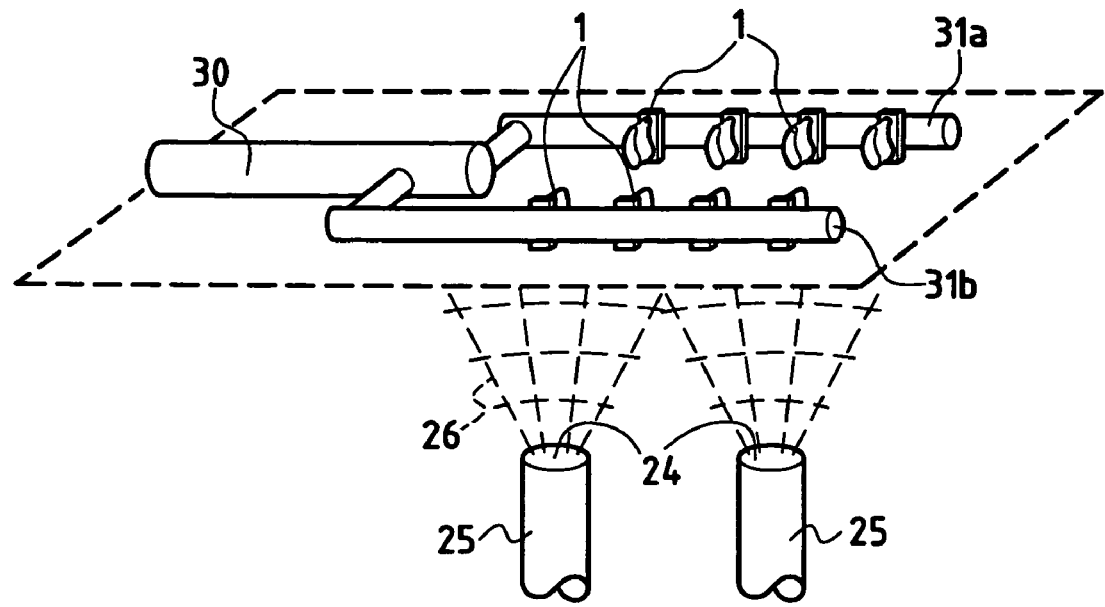
FIG. 12 shows a device for supporting parts in the ceramic deposition apparatus.
Figure 13:
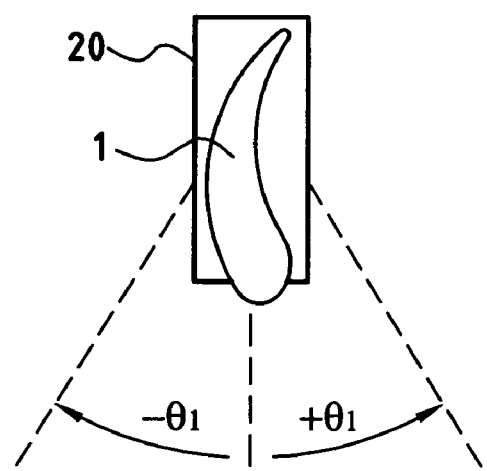
FIG. 13 shows the oscillating motion of the exposed part.

The device 27 shown in FIG. 12 comprises, for example, an arm 30 terminated by a fork having two parallel prongs 31a and 31b on which parts 1, e.g. turbine blades or vanes, are mounted in such a manner as to be capable of pivoting through an angle of $\pm\theta_1$ about an equilibrium position, as can be seen in FIG. 13. The clouds 26 of vapor are emitted by two ceramic matrix bars 25 that are spaced apart along the axis of the arms 30. The blades 1 are shown in FIG. 12 without the masks 20 in order to clarify the figure, and they are disposed vertically, so that their leading edges face the bars 25 and their trailing edges face upwards. The presence of two sources of ceramic vapor 25 makes it possible to have a vapor field 26 that is more uniform in the vicinity of the blades.

Figure 14A:
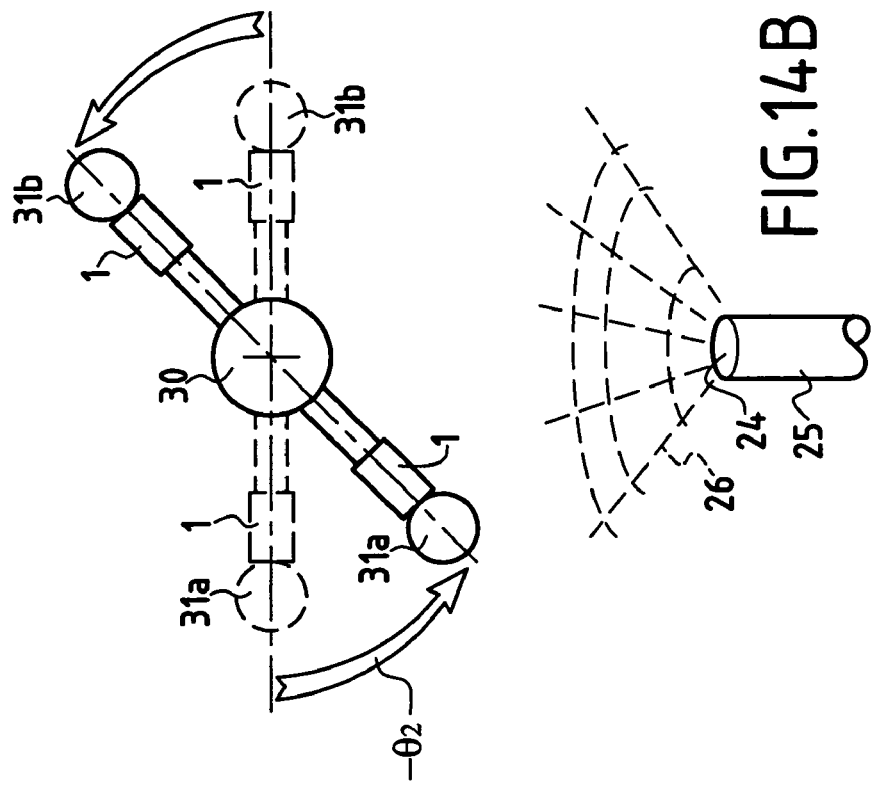
FIGS. 14A and 14B show an example of the motion of the part support while ceramic is being deposited.
Figure 14B:
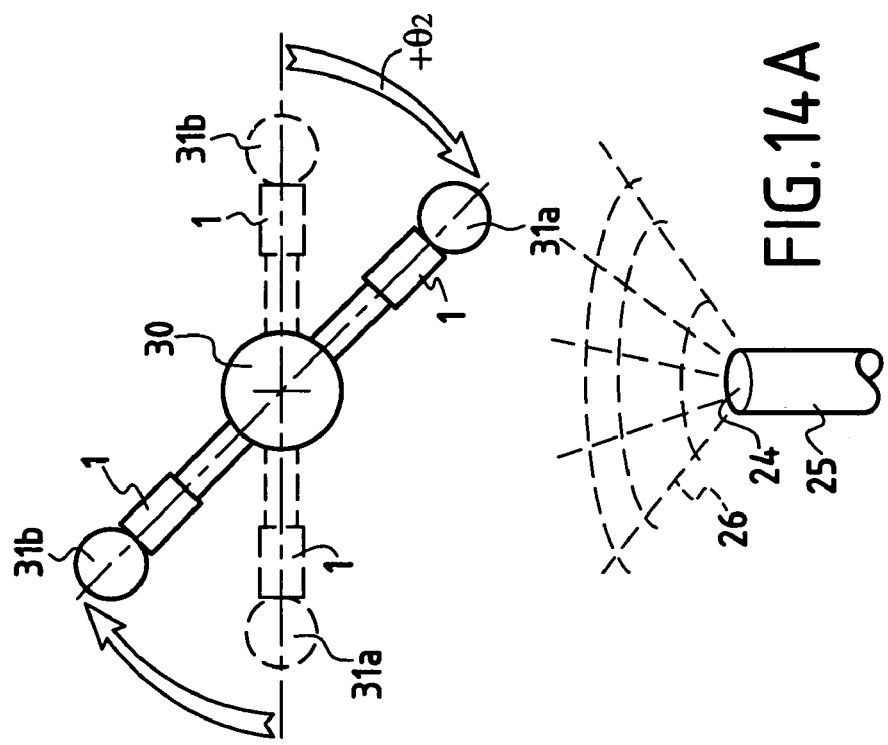

The arm 30 can itself be subjected to oscillating motion through an angle of $\pm\theta_2$ about its axis, as shown in FIGS. 14A and 14B.

Figure 15A:
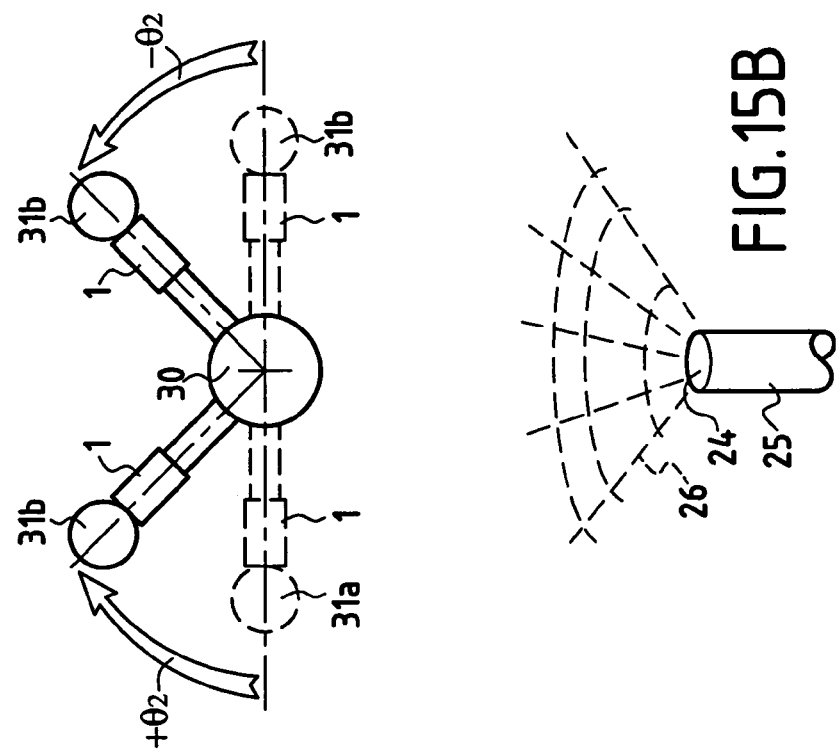
FIGS. 15A and 15B show a variant of the motion of the part support.
Figure 15B:
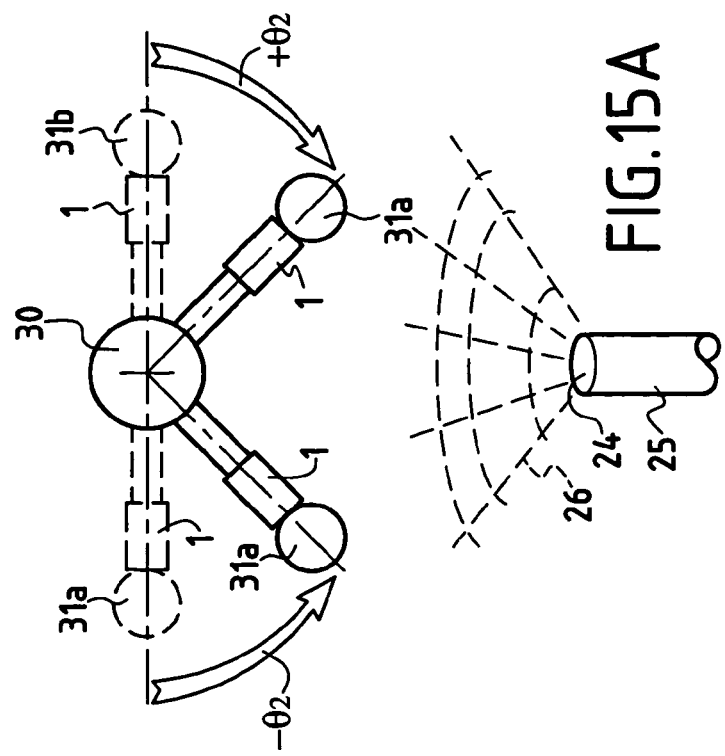

In a variant embodiment shown in FIGS. 15A and 15B, the prongs 31a and 31b are connected to the arm 30 by link arms 32a and 32b capable of oscillating symmetrically about a vertical plane containing the arm 30 through an angle of $\pm\theta_2$.

The amplitudes $\theta_1$ and $\theta_2$ of the oscillations of the parts 1 and of the arms 31a, 31b are a function of the configuration of the indentations 10 to be filled with ceramic.

When the zone to be coated is the leading edge of a turbine blade, the parts 1 are exposed to ceramic vapor for a length of time that is significantly shorter than the length of time that a new blade needs to be exposed in order to cover is entire surface.

Figure 16:
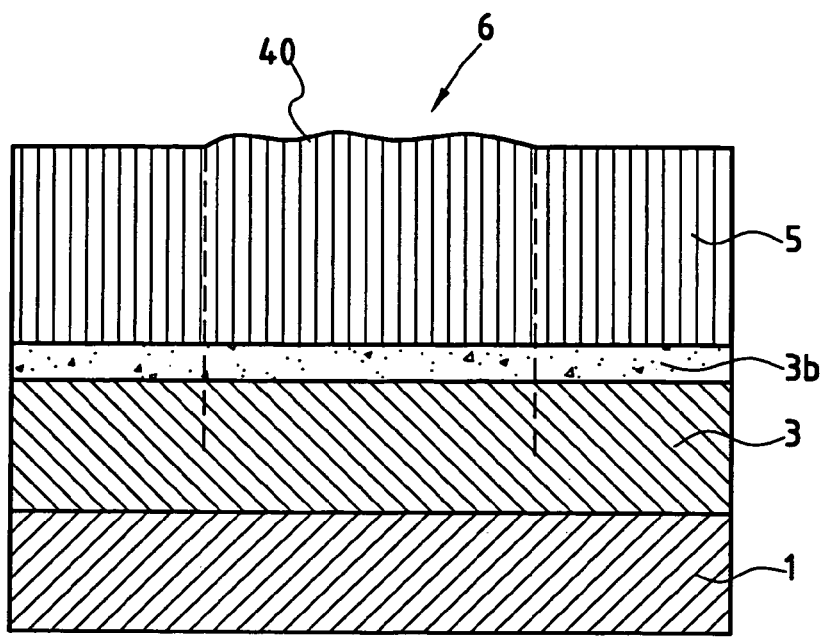
FIG. 16 is a section zone of the zone for repair after the ceramic has been deposited.

The ceramic fill 40 placed in the indentation 10 is of columnar structure identical to that of the remaining ceramic layer 5. The length of time the parts 1 are exposed is such that the columnar structure in the indentation 10 projects a little beyond the remaining ceramic outer layer 5, as shown in FIG. 16.

Figure 17:
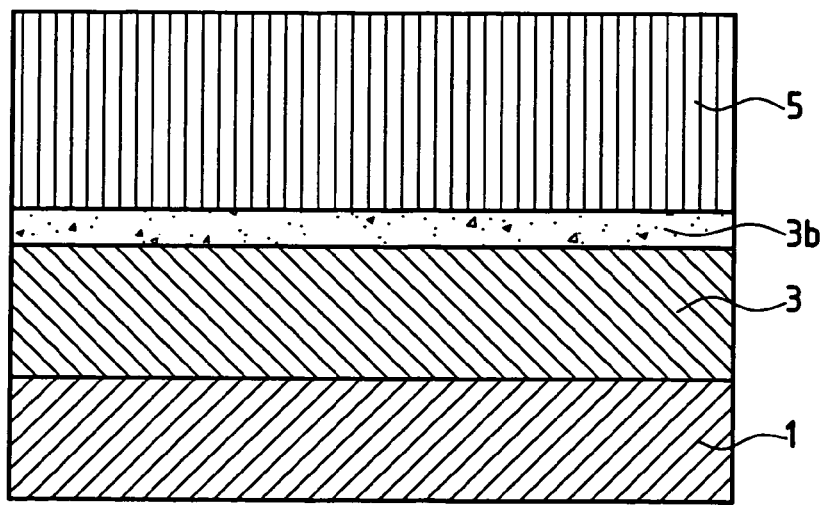
FIG. 17 shows a section of the zone for repair after it has been polished.

All that then remains to be done is to remove the top from the ceramic columns in the indentation 10 by polishing using abrasive paper in order to restore the initial profile of the part 1 to the new coating as shown in FIG. 17.

The invention claimed is:

1. A method of locally repairing parts coated with a thermal barrier comprising a ceramic outer layer and a metal underlayer of alumina-forming alloy for protecting a substrate against oxidation and for bonding with the ceramic outer layer, the method comprising:
   defining the zone for repair with a first mechanical mask adapted to the shape of the part and the zone for repair;
   scouring the zone for repair so as to remove from said zone the ceramic, the alumina layer, and the damaged portions of the underlayer;

supplying materials for repairing the underlayer to said zone by subjecting the partially-scoured part to metal deposition by an electrical current; and subjecting the part to heat treatment in order to enable the deposited metals to diffuse into the remaining underlayer in the zone for repair and to enable a surface film of alumina to form.

2. A method according to claim 1, wherein the zone for repair is scoured mechanically by sandblasting, sanding, grinding, or by laser beam.

3. A method according to claim 1 or claim 2, wherein the materials for repairing the underlayer are supplied to the zone for repair by electrophoresis.

4. A method according to claim 1, wherein platinum or palladium is deposited by electrolysis.

5. A method according to claim 1, wherein a layer of aluminizing paint is applied on the deposited metals.

6. A method according to claim 1, wherein, after subjecting the part to heat treatment, the zone for repair is again defined by a second mechanical mask and a new ceramic outer layer is deposited on the zone for repair.

7. A method according to claim 6, wherein the new ceramic outer layer is deposited by a method of evaporating ceramic by electron bombardment.

8. A method according to claim 7, wherein the surface of the zone for repair is exposed to a source for emitting ceramic vapor.

9. A method according to claim 8, wherein the part is caused to pivot with oscillating motion of a given amplitude during exposure so as to deposit a substantially uniform layer of ceramic on the zone for repair.

10. A method according to claim 9, wherein the part is caused to pivot with oscillating motion of a first amplitude in a first direction and a second amplitude in a second direction during exposure so as to deposit a substantially uniform layer of ceramic on the zone for repair.

11. A method according to claim 10, wherein the first and second amplitudes are a function of an indentation made in the part during the scouring.

12. A method according to claim 9, wherein the given amplitude is a function of an indentation made in the part during the scouring.

13. A method according to claim 1, wherein the materials for repairing the underlayer are supplied to the zone of repair simultaneously by electrophoresis and by electrolysis.

14. A method according to claim 1, wherein the zone for repair comprises flat side walls after the scouring.

* * * * *

UNITED STATES PATENT AND TRADEMARK OFFICE
CERTIFICATE OF CORRECTION

PATENT NO. : 7,008,522 B2
APPLICATION NO. : 10/488294
DATED : March 7, 2006
INVENTOR(S) : Boucard et al.

It is certified that error appears in the above-identified patent and that said Letters Patent is hereby corrected as shown below:

<u>Title page,</u>
Item [73], should read:
-- [73] Assignees: Snecma Moteurs, Paris (FR)
                               Snecma Services, Paris (FR) --.

Signed and Sealed this

Twenty-seventh Day of June, 2006

JON W. DUDAS
*Director of the United States Patent and Trademark Office*